(12) United States Patent
Jun et al.

(10) Patent No.: US 12,474,260 B2
(45) Date of Patent: Nov. 18, 2025

(54) TERAHERTZ SIGNAL MEASURING APPARATUS AND MEASURING METHOD

(71) Applicant: SAMSUNG ELECTRONICS CO., LTD., Suwon-si (KR)

(72) Inventors: Sunhong Jun, Suwon-si (KR); Inkeun Baek, Suwon-si (KR); Wontae Kim, Suwon-si (KR); Namil Koo, Suwon-si (KR); Ingi Kim, Suwon-si (KR); Sungyoon Ryu, Suwon-si (KR); Younghoon Sohn, Suwon-si (KR); Yusin Yang, Suwon-si (KR); Ikseon Jeon, Suwon-si (KR); Eunhyuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/389,028

(22) Filed: Nov. 13, 2023

(65) Prior Publication Data
US 2024/0230528 A1    Jul. 11, 2024

(30) Foreign Application Priority Data
Jan. 10, 2023   (KR) .................. 10-2023-0003515

(51) Int. Cl.
*G01N 21/3581*   (2014.01)
*G01N 21/95*     (2006.01)
*H01L 21/66*     (2006.01)

(52) U.S. Cl.
CPC ..... *G01N 21/3581* (2013.01); *G01N 21/9501* (2013.01); *H01L 22/12* (2013.01)

(58) Field of Classification Search
CPC ........... G01N 21/3581; G01N 21/9501; G01N 21/9505; G01N 21/3586; H01L 22/12; G01J 3/42; G01J 2003/423
See application file for complete search history.

(56) References Cited

U.S. PATENT DOCUMENTS 9,228,899 B2   1/2016   Zhang et al.
9,599,555 B2   3/2017   Richter et al.
(Continued)

FOREIGN PATENT DOCUMENTS

CN    106932357 A  *  7/2017   ......... G01N 21/3581
KR    10-1739628 B1    5/2017
(Continued)

OTHER PUBLICATIONS

Translation of CN-106932357-A (Year: 2017).*

*Primary Examiner* — David P Porta
*Assistant Examiner* — Mamadou Faye
(74) *Attorney, Agent, or Firm* — Sughrue Mion, PLLC

(57) ABSTRACT

A measuring apparatus includes a stage including a transmissive wafer chuck on which a sample wafer is provided, where the sample wafer includes a silicon substrate and at least one material layer on the silicon substrate, a light source unit including a light source configured to generate and output a femtosecond laser beam, and a confocal laser-induced terahertz (THz) emission microscopy (LTEM) unit configured to generate multi-photon excitation by splitting the femtosecond laser beam into four sub-laser beams and causing three sub-laser beams among the four sub-laser beams to be incident in an overlapping manner on a measurement position of the sample wafer, where the confocal LTEM unit is configured to generate the multi-photon excitation based on the three sub-laser beams being incident on a lower surface of the silicon substrate.

20 Claims, 16 Drawing Sheets

(56) References Cited

U.S. PATENT DOCUMENTS

| | | | |
|---|---|---|---|
| 9,909,986 | B2 | 3/2018 | Rahman et al. |
| 10,254,252 | B2 | 4/2019 | Yacoubian |
| 2018/0334399 | A1* | 11/2018 | Fahs, II .................... C02F 1/36 |
| 2020/0182783 | A1 | 6/2020 | Jun et al. |

FOREIGN PATENT DOCUMENTS

| | | |
|---|---|---|
| KR | 10-2285056 B1 | 8/2021 |
| KR | 10-2022-0075033 A | 6/2022 |

* cited by examiner

FIA. 6A
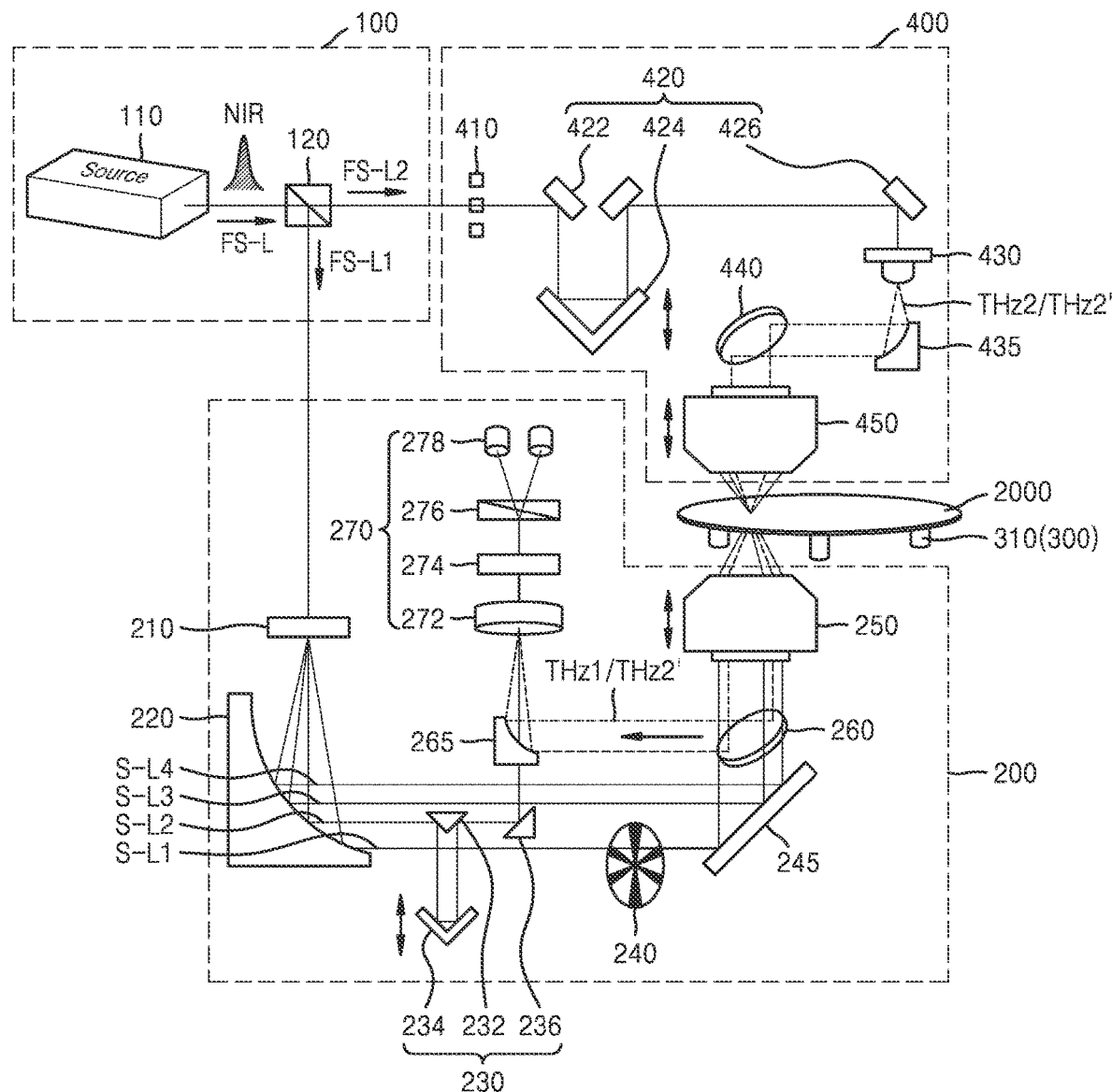

TERAHERTZ SIGNAL MEASURING APPARATUS AND MEASURING METHOD

CROSS-REFERENCE TO RELATED APPLICATION

This application is based on and claims priority to Korean Patent Application No. 10-2023-0003515, filed on Jan. 10, 2023, in the Korean Intellectual Property Office, the disclosure of which is incorporated herein by reference in its entirety.

BACKGROUND

1. Field

Example embodiments of the disclosure relate to a measuring apparatus, and more particularly, to an apparatus and method for measuring a semiconductor device using a terahertz (THz) signal.

2. Description of Related Art

Recently, THz signal spectroscopic measuring apparatuses have been used to measure semiconductor devices. In a THz signal spectroscopic measuring apparatus, a THz-generating device for generating a THz signal and a THz-detecting device for detecting a THz signal may be integrally installed. The THz signal-based spectroscopic measuring apparatus may generate THz waves, and may acquire information on an object to be measured by emitting the THz waves to the object to be measured. In addition, in a method for detecting a THz signal, probe light having a different wavelength from the THz signal may be incident on a nonlinear crystal such that the wavelength of the probe light may be converted, and the THz signal may be indirectly detected based on the probe light of which the wavelength has been converted.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a measuring apparatus and method, by which a terahertz (THz) signal may be effectively generated, and an ion doping concentration according to depth may be measured using the THz signal.

Additional aspects will be set forth in part in the description which follows and, in part, will be apparent from the description, or may be learned by practice of the presented embodiments.

According to an aspect of an example embodiment, a measuring apparatus may include a stage including a transmissive wafer chuck on which a sample wafer is provided, where the sample wafer may include a silicon substrate and at least one material layer on the silicon substrate, a light source unit including a light source configured to generate and output a femtosecond laser beam, and a confocal laser-induced THz emission microscopy (LTEM) unit configured to generate multi-photon excitation by splitting the femtosecond laser beam into four sub-laser beams and causing three sub-laser beams among the four sub-laser beams to be incident in an overlapping manner on a measurement position of the sample wafer, where the confocal LTEM unit is configured to generate the multi-photon excitation based on the three sub-laser beams being incident on a lower surface of the silicon substrate.

According to an aspect of an example embodiment, a measuring apparatus may include a stage including a transmissive wafer chuck on which a sample wafer is arranged, where the sample wafer may include a silicon substrate and an insulating layer on the silicon substrate, a light source unit including a light source configured to generate and output a femtosecond laser beam and a beam splitter configured to split the femtosecond laser beam into a first femtosecond laser beam and a second femtosecond laser beam, a confocal LTEM unit including a four-way diffractive optic element (DOE), a first time difference generator, an optical chopper, a first reflective objective lens, a first dichroic mirror, and a THz signal measurer, the confocal LTEM unit being configured to generate multi-photon excitation by causing three sub-laser beams among four sub-laser beams split from the first femtosecond laser beam to be incident in an overlapping manner on a measurement position of the sample wafer, and a THz pump-probe unit including a beam shutter, a second time difference generator, a THz antenna, a second dichroic mirror, and a second reflective objective lens, the THz pump-probe unit being configured to generate a first THz signal using the second femtosecond laser beam and cause the first THz signal to be incident on the measurement position, where the confocal LTEM unit is configured to generate the multi-photon excitation based on the three sub-laser beams being incident on a lower surface of the silicon substrate and the first THz signal may pass through the $SiO_2$ insulating layer to be incident on an upper surface of the silicon substrate.

According to an aspect of an example embodiment, a measuring apparatus may include a stage including a transmissive wafer chuck on which a sample wafer is arranged, where the sample wafer may include a silicon substrate and at least one material layer on the silicon substrate, a light source unit including a light source configured to generate and output a femtosecond laser beam and a beam splitter configured to split the femtosecond laser beam into a first femtosecond laser beam and a second femtosecond laser beam, a confocal LTEM unit configured to generate multi-photon excitation by splitting the first femtosecond laser beam into four sub-laser beams and causing three sub-laser beams among the four sub-laser beams to be incident in an overlapping manner on a measurement position of the sample wafer, and a THz pump-probe unit configured to generate a first THz signal using the second femtosecond laser beam and cause the first THz signal to be incident on the measurement position, where the confocal LTEM unit is configured to generate the multi-photon excitation based on the three sub-laser beams being incident on a lower surface of the silicon substrate and the first THz signal may pass through the at least one material layer to be incident on an upper surface of the silicon substrate.

According to an aspect of an example embodiment, a measuring method may include generating, by a light source, a femtosecond laser beam, splitting, by a beam splitter, the femtosecond laser beam into a first femtosecond laser beam and a second femtosecond laser beam, generating multi-photon excitation by splitting the first femtosecond laser beam into four sub-laser beams and causing three sub-laser beams among the four sub-laser beams to be incident in an overlapping manner on a measurement position of a sample wafer, and detecting a THz signal by detecting a first THz signal generated through the multi-photon excitation and detecting a second THz signal of which absorption has been changed due to the multi-photon excitation, where the sample wafer may include a silicon substrate and at least one material layer on the silicon substrate and where the multi-photon excitation may be generated based on the three sub-laser beams being incident on a lower surface of the silicon substrate.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 6A is a diagram illustrating the THz signal measuring apparatus of FIG. 5 according to an embodiment;

DETAILED DESCRIPTION

Figure 1:
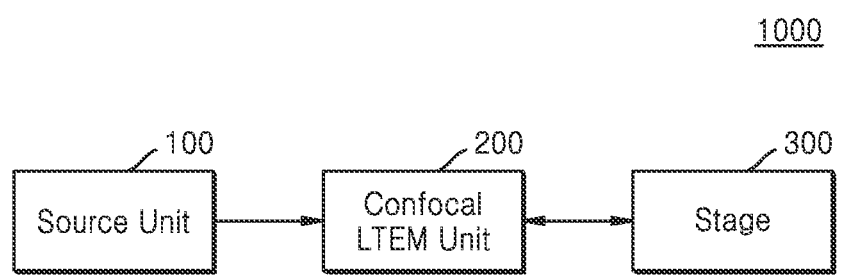
FIG. 1 is a block diagram of a terahertz (THz) signal measuring apparatus according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 2A:
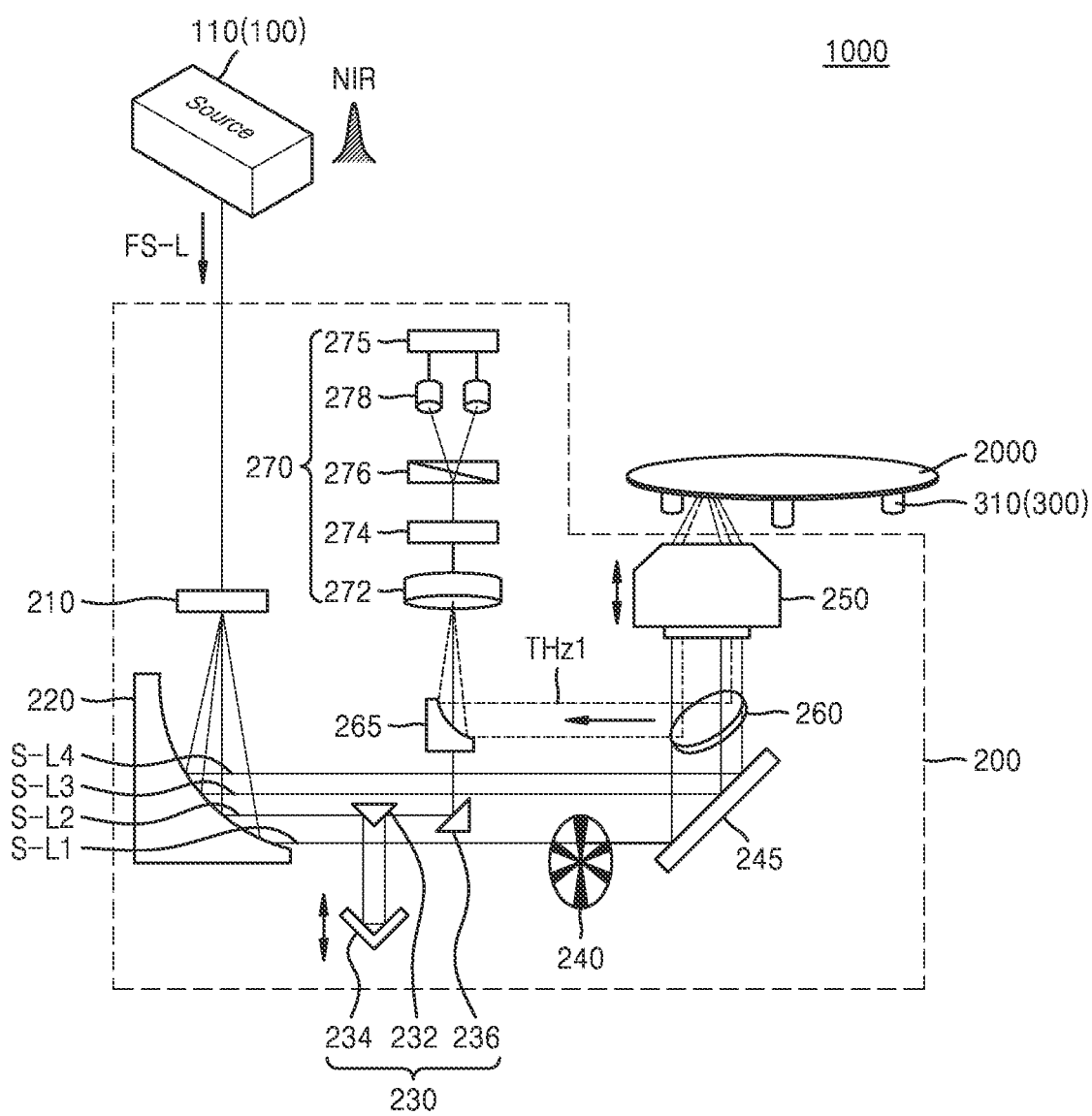
FIGS. 2A, 2B and 2C are diagrams illustrating the THz signal measuring apparatus of FIG. 1 according to an embodiment.
Figure 2B:
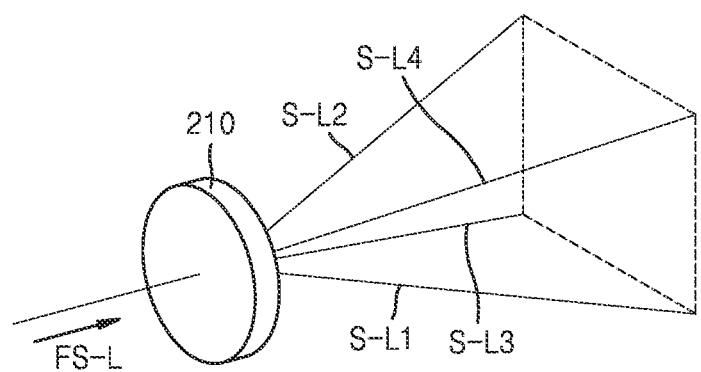
Figure 2C:
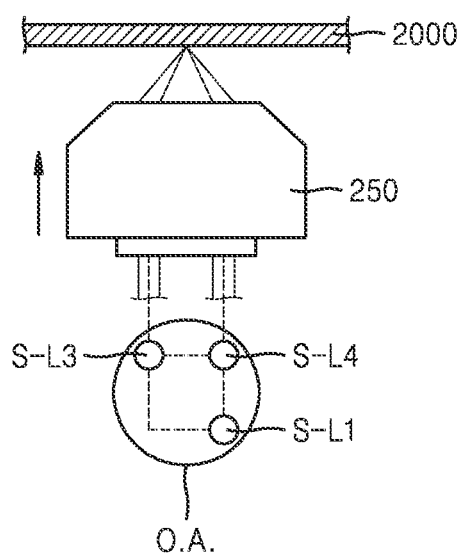

FIG. 1 is a block diagram of a terahertz (THz) signal measuring apparatus according to an embodiment. FIGS. 2A, 2B and 2C are diagrams illustrating the THz signal measuring apparatus of FIG. 1 according to an embodiment.

Referring to FIGS. 1 to 2C, a THz signal measuring apparatus 1000 (e.g., a measuring apparatus configured to measure THz signals) (hereinafter, simply referred to as a "measuring apparatus") may include a light source unit 100, a confocal laser-induced THz emission microscopy (LTEM) unit 200, and a stage 300.

The light source unit 100 may include a light source 110. The light source 110 may generate and output a laser beam having a very short pulse. The light source 110 may generate and output, for example, a femtosecond laser beam FS-L. The femtosecond laser beam FS-L may have a pulse length of about 10 fs to about 200 fs. However, the pulse length of the femtosecond laser beam FS-L is not limited to the above range.

The femtosecond laser beam FS-L may have a near-infrared ray (NIR) wavelength. In the measuring apparatus 1000, the femtosecond laser beam FS-L generated from the light source 110 may have a wavelength of 1,000 nm or more. More specifically, the femtosecond laser beam FS-L may have a wavelength in a range of about 1,000 nm to about 1,600 nm. The measuring apparatus 1000 may use the femtosecond laser beam FS-L having a long wavelength. As described below, the measuring apparatus 1000 may split the femtosecond laser beam FS-L into three sub-laser beams and allow the three sub-laser beams to be incident in an overlapping manner on a measurement position of a sample wafer 2000 as an object to be measured, thereby generating multi-photon excitation. The multi-photon excitation will be described in more detail below in the description of the confocal LTEM unit 200.

The confocal LTEM unit 200 may include a four-way diffractive optic element (DOE) 210, an off-axis parabolic mirror 220, a first time difference generator 230, an optical chopper 240, a first reflective objective lens 250, a first dichroic mirror 260, and a THz signal measurer 270.

The four-way DOE 210 may split the femtosecond laser beam FS-L from the light source 110 into four sub-laser beams (e.g., first to fourth sub-laser beams S-L1, S-L2, S-L3, and S-L4) by diffraction. The first to fourth sub-laser beams S-L1, S-L2, S-L3, and S-L4 split from the first femtosecond laser beam FS-L may each be a femtosecond laser beam, and may have different wavelengths within the NIR wavelength range. In the measuring apparatus 1000, the four-way DOE 210 may spread the femtosecond laser beam FS-L into four paths in directions of vertices of a quadrangle, as shown in FIG. 2B. In general, beams diffracted while passing through a DOE include many high-order components. However, in the measuring apparatus 1000, second or higher-order components may be excluded, and the first to fourth sub-laser beams S-L1, S-L2, S-L3, and S-L4 of a first-order component may be used.

The off-axis parabolic mirror 220 may collimate the first to fourth sub-laser beams S-L1, S-L2, S-L3, and S-L4 from the four-way DOE 210 by rotating the first to fourth sub-laser beams S-L1, S-L2, S-L3, and S-L4 in a direction of 90°. The off-axis parabolic mirror 220 may be advantageous for removing aberrations and implementing high resolution in a compact spectrometer having a short focal length.

Among the first to fourth sub-laser beams S-L1, S-L2, S-L3, and S-L4 collimated by the off-axis parabolic mirror 220, three sub-laser beams (e.g., the first, third, and fourth sub-laser beams S-L1, S-L3, and S-L4) may be used to generate THz signals, and the second sub-laser beam S-L2 may be used as a reference beam. Specifically, the first, third, and fourth sub-laser beams S-L1, S-L3, and S-L4 may be incident on the first reflective objective lens 250 through a first flat mirror 245. The second sub-laser beam S-L2 may be incident on the THz signal measurer 270 through the first time difference generator 230.

One sub-laser beam (e.g., the first sub-laser beam S-L1) among the first, third, and fourth sub-laser beams S-L1, S-L3, and S-L4 may pass through the optical chopper 240 and be incident on the first reflective objective lens 250 through the first flat mirror 245. The optical chopper 240 may be a device for regulating laser beams, and may periodically regulate the first sub-laser beam S-L1. The optical chopper 240 may function to exclude THz signals generated by two sub-laser beams, in conjunction with a lock-in-amp 275 installed in the THz signal measurer 270. In other words, the optical chopper 240, together with the lock-in-amp 275, may allow/cause only THz signals generated by three sub-laser beams to be detected.

The first reflective objective lens 250 may be a reflective objective lens having a high magnification or a high numerical aperture (NA). For example, the first reflective objective lens 250 may have a magnification of tens to hundreds of times. The reflective objective lens may include a main mirror in the form of an aspheric mirror and a secondary mirror in the form of an aspheric mirror. An open hole may be formed at a center of the main mirror, and a laser beam may be incident on the reflective objective lens through the open hole. The incident laser beam may be reflected by the secondary mirror and the main mirror to be obliquely incident on the sample wafer 2000 as an object to be measured. An inclination angle of the laser beam incident on the sample wafer 2000 may be changed through linear movement.

In the measuring apparatus 1000, among the first to fourth sub-laser beams S-L1, S-L2, S-L3, and S-L4, the second sub-laser beam S-L2 as a reference beam may be incident on the THz signal measurer 270 through the first time difference generator 230. Thus, as shown in FIG. 2C, only the first, third, and fourth sub-laser beams S-L1, S-L3, and S-L4 may be condensed by the first reflective objective lens 250 and be incident on the sample wafer 2000. In addition, the first, third, and fourth sub-laser beams S-L1, S-L3, and S-L4 may be incident on a boundary between a silicon (Si) substrate 2100 (see FIG. 3A) and an upper insulating layer 2200 (see FIG. 3A) of the sample wafer 2000. The upper insulating layer 2200 may be, for example, a silicon-oxide (e.g., $SiO_2$) layer. However, the upper insulating layer 2200 is not limited to the silicon-oxide layer. In addition, other material layers may be further arranged on the upper insulating layer 2200.

Because the first, third, and fourth sub-laser beams S-L1, S-L3, and S-L4 are incident in an overlapping manner on a measurement position of the boundary, multi-photon excitation may be generated, and thus, a first THz signal THz1 may be generated. As indicated by a dotted line in FIG. 2A, the first THz signal THz1 may be generated in a measurement portion of the sample wafer 2000 and be input to the THz signal measurer 270 through the first reflective objective lens 250, the first dichroic mirror 260, and an off-axis parabolic mirror 265. The first dichroic mirror 260 may include many thin films having different refractive indices. The first dichroic mirror 260 may reflect beams of a certain wavelength and transmit beams of other wavelengths. As compared with a related art color filter, the first dichroic mirror 260 may have very little absorption loss, and the wavelength range of a reflected beam may be changed according to the material thickness or structure of the first dichroic mirror 260.

In the case of a related art LTEM, a THz signal may be generated by condensing a single laser beam having a wavelength of 800 nm, which is a pump light source, through a lens and allowing the laser beam to be incident on a sample wafer. In contrast, in the measuring apparatus 1000, three laser beams (e.g., the first, third, and fourth sub-laser beams S-L1, S-L3, and S-L4) may be condensed through the first reflective objective lens 250 and be incident on the sample wafer 2000, as shown in FIG. 2C. To excite the direct band gap of silicon, multi-photon excitation of three or more photons may be required. For example, for multi-photon excitation, three photons may be required in a range of about 1,000 nm to about 1,300 nm, and four photons may be required in a range of about 1,300 nm to about 1,600 nm.

In the measuring apparatus 1000, the first THz signal THz1 may be generated by allowing the first, third, and fourth sub-laser beams S-L1, S-L3, and S-L4 having a long wavelength of 1,000 nm or more (e.g., in a range of about 1,000 nm to about 1,600 nm) to be incident in an overlapping manner on a measurement position. Specifically, in an overlapping area where the first, third, and fourth sub-laser beams S-L1, S-L3, and S-L4 overlap, energy exceeding the band gap of silicon may be obtained due to the multi-photon excitation, and separate charge carriers may be instantaneously generated in the valence band and conduction band. The concentration of the generated carriers may be proportional to ions doped on the silicon substrate 2100. As described above, multi-photon excitation due to only a single laser beam or two laser beams may be excluded from the first THz signal THz1 using the optical chopper 240 and the lock-in-amp 275.

The first time difference generator 230 may delay and adjust the time at which one of the first to fourth sub-laser beams S-L1, S-L2, S-L3, and S-L4 (e.g., the second sub-laser beam S-L2) is input to the THz signal measurer 270. The first time difference generator 230 may include first to third optical mirrors 232, 234, and 236. As indicated by a double-sided arrow, the first time difference generator 230 may adjust a delay time of the second sub-laser beam S-L2 by linearly moving the second optical mirror 234. The second sub-laser beam S-L2 may function as a reference beam. As described below, the reference beam may refer to a beam used to indirectly detect the first THz signal THz1.

The THz signal measurer 270 may include an electro-optic (EO) crystal 272, a ¼ wave ($\lambda/4$) plate 274, a polarizer 276, and two photodetectors 278.

The first THz signal THz1 and the second sub-laser beam S-L2 may be simultaneously incident on the EO crystal 272. When the first THz signal THz1 and the second sub-laser beam S-L2 are simultaneously incident on the EO crystal 272, birefringence may be induced due to a Pockel effect caused by propagation of the first THz signal THz1. Accordingly, the EO crystal 272 may change the polarization state of the second sub-laser beam S-L2 through the birefringence and emit the second sub-laser beam S-L2. The amount of birefringence of the EO crystal 272 depends on the intensity of the first THz signal THz1, and thus, the amount of change in the polarization state of the second sub-laser beam S-L2 passing through the EO crystal 272 may depend on the intensity of the first THz signal THz1. Consequently, by detecting the amount of change in the polarization state of the second sub-laser beam S-L2, the first THz signal THz1 (e.g., the intensity of the first THz signal THz1) may be detected.

The $\lambda/4$ plate 274 may be arranged on an optical path of the EO crystal 272 and the polarizer 276. The $\lambda/4$ plate 274 may adjust the polarization state of the second sub-laser beam S-L2 emitted from the EO crystal 272. For example, when the polarizer 276 is a Wollaston polarizer, the second sub-laser beam S-L2 passing through the $\lambda/4$ plate 274 and the polarizer 276 may be split into two polarization components orthogonal to each other and be output.

Each of the two photodetectors 278 may include, for example, a photodiode (PD). The two photodetectors 278 may respectively detect powers of the two polarization components of the second sub-laser beam S-L2 split by the polarizer 276, and may respectively output electrical signals according to the detected powers. The two photodetectors 278 may not detect the first THz signal THz1. Electrical signals from the two photodetectors 278 may be input to a differential amplifier, and the differential amplifier may output a difference between the electrical signals to the lock-in-amp 275. Accordingly, a signal output from the lock-in-amp 275 may depend on the intensity of the first THz signal THz1. The lock-in-amp 275 may be synchronized with the optical chopper 240 and exclude, from the first THz signal THz, THz signals generated by only a single laser beam or two laser beams.

As such, in the measuring apparatus 1000, the THz signal measurer 270 may detect the polarization state of the second sub-laser beam S-L2 as a reference beam using the EO crystal 272, the λ/4 plate 274, the polarizer 276, and the photodetectors 278, thereby indirectly detecting the intensity of the first THz signal THz1 generated by the sample wafer 2000. In addition, based on the indirectly detected intensity of the first THz signal THz1, information on the sample wafer 2000 may be obtained. For example, information about the presence or absence of defects or a doping concentration of ions in the measurement portion of the sample wafer 2000 may be obtained.

The stage 300 may include a wafer chuck 310 and a stage body. The sample wafer 2000 may be arranged on the wafer chuck 310. The wafer chuck 310 may be, for example, a three-point wafer chuck. The wafer chuck 310 may be arranged on the stage body. The stage body may be operated by a motor, and may be of a transmissive type. Accordingly, a sub-laser beam from the first reflective objective lens 250 may pass through the stage 300 and be incident on the sample wafer 2000.

The measuring apparatus 1000 may split a femtosecond laser beam into three sub-laser beams and allow the three sub-laser beams to be incident in a temporally and spatially overlapping manner on a measurement position of the sample wafer 2000 as an object to be measured (e.g., on the boundary between the silicon substrate 2100 and the upper insulating layer 2200), thereby easily generating the first THz signal THz1. Specifically, the measuring apparatus 1000 may allow a femtosecond laser beam to be incident through a lower surface of the silicon substrate 2100, such that the femtosecond laser beam may be easily incident on the boundary between the silicon substrate 2100 and the upper insulating layer 2200, regardless of material layers on an upper surface of the silicon substrate 2100. In addition, using a laser beam having a wavelength of 1,000 nm or more with high transmittance through silicon, the incident efficiency of the laser beam incident on the boundary between the silicon substrate 2100 and the upper insulating layer 2200 may be increased. In addition, because a downward portion of the generated first THz signal THz1 is collected through the first reflective objective lens 250, the first THz signal THz1 may be reliably measured regardless of the material layers on the upper surface of the silicon substrate 2100. Furthermore, the measuring apparatus 1000 may split a femtosecond laser beam into three sub-laser beams and allow the three sub-laser beams to be incident in a temporally and spatially overlapping manner on a measurement area, thereby having a significantly improved spatial resolution, as compared with a related art LTEM. The incidence of a femtosecond laser beam through the lower surface of the silicon substrate 2100 will be described in more detail with reference to FIGS. 3A to 3C. In addition, the spatial resolution will be described in more detail with reference to FIGS. 4A and 4B.

Figure 3A:
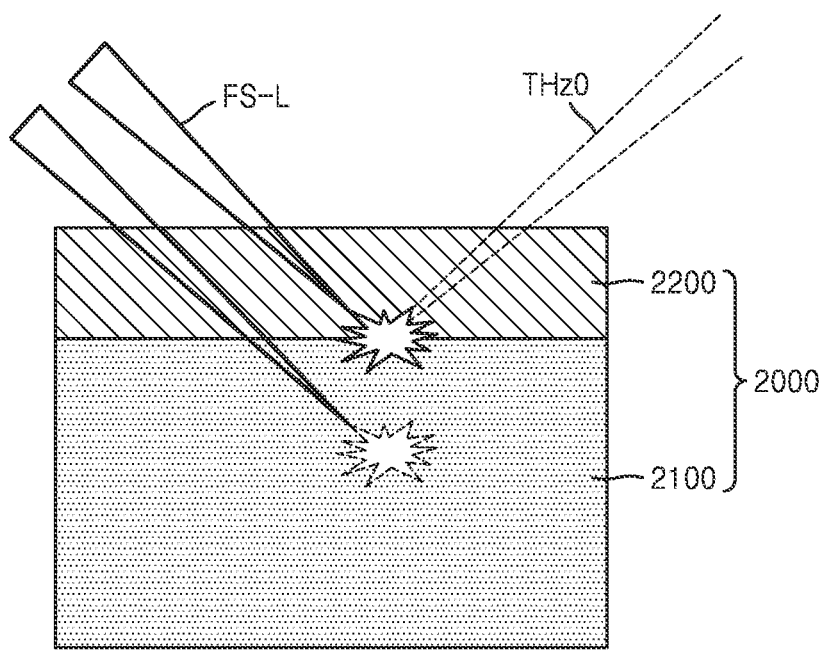
FIGS. 3A, 3B and 3C are diagrams illustrating generation of a THz signal.
Figure 3B:
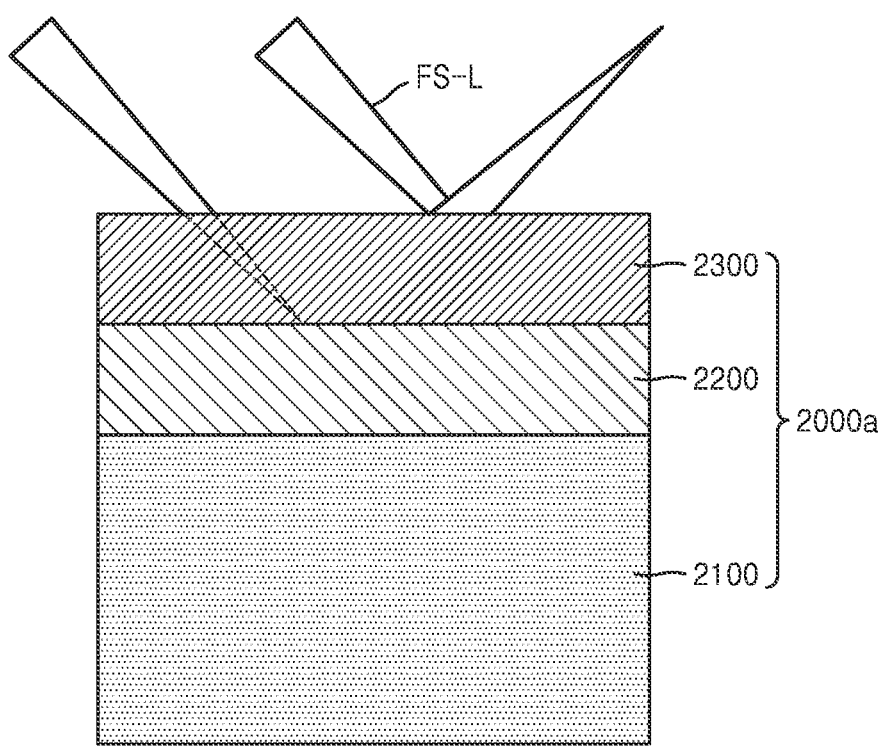
Figure 3C:
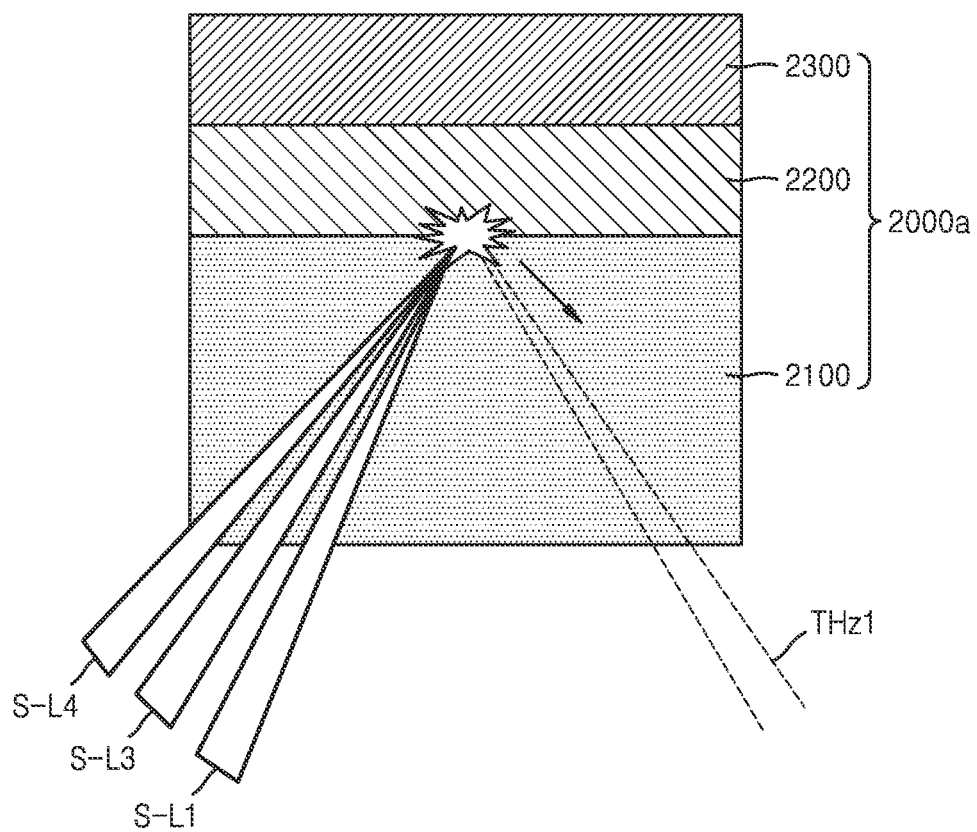

FIGS. 3A, 3B and 3C are diagrams illustrating generation of a THz signal. FIGS. 3A and 3B illustrate cases according to a comparative example, and FIG. 3C illustrate a case according to example embodiments.

Referring to FIG. 3A, in the case of the THz signal measuring apparatus of the comparative example, the femtosecond laser beam FS-L may be incident from an upper portion of the sample wafer 2000. In addition, the femtosecond laser beam FS-L may be incident on the boundary between the silicon substrate 2100 and the upper insulating layer 2200, and a THz signal THz0 may be generated at the boundary between the Silicon substrate 2100 and the upper insulating layer 2200. The THz signal THz0 that has been generated may be detected through the upper portion of the sample wafer 2000. In the THz signal measuring apparatus of the comparative example, because one laser beam is used, a laser beam having a relatively short wavelength (e.g., a wavelength of 800 nm) may be used.

In the THz signal measuring apparatus of the comparative example, the femtosecond laser beam FS-L that is incident into the Silicon substrate 2100 through the boundary between the Silicon substrate 2100 and the upper insulating layer 2200 may not contribute to generating the THz signal THz0. That is, in the case of the THz signal measuring apparatus of the comparative example, because the THz signal THz0 is generated and emitted only at the boundary between the silicon substrate 2100 and the upper insulating layer 2200, information on a doping concentration according to the depth of the silicon substrate 2100 may not be obtained.

Referring to FIG. 3B, a sample wafer 2000a may include an additional material layer 2300 on the upper insulating layer 2200. The additional material layer 2300 may be, for example, an opaque layer or a metal layer. As such, in a case where the sample wafer 2000a includes the additional material layer 2300, when the femtosecond laser beam FS-L is incident on an upper portion of the sample wafer 2000a, the femtosecond laser beam FS-L may be absorbed or reflected by the additional material layer 2300. Accordingly, a THz signal may not be generated at the boundary between the silicon substrate 2100 and the upper insulating layer 2200. In addition, even when a THz signal is generated, because the THz signal is detected through the upper portion of the sample wafer 2000a, detection of the THz signal may be very insignificant due to the additional material layer 2300, and thus, accurate measurement of the THz signal may not be possible.

Referring to FIG. 3C, in the case of the THz signal measuring apparatus 1000 (i.e., according to an example embodiment), the femtosecond laser beam FS-L may be incident from a lower portion of the sample wafer 2000a. In addition, the femtosecond laser beam FS-L may be incident on the boundary between the silicon substrate 2100 and the upper insulating layer 2200, and the first THz signal THz1 may be generated at the boundary between the silicon substrate 2100 and the upper insulating layer 2200. As shown in FIG. 3C, the first THz signal THz1 may be detected through the lower portion of the sample wafer 2000a.

In the THz signal measuring apparatus 1000, because three femtosecond laser beams are used, a laser beam having a long wavelength (e.g., a wavelength of 1,000 nm or more) may be used. As such, using a femtosecond laser beam having a wavelength of 1,000 nm or more with high transmittance through silicon, the incident efficiency of the femtosecond laser beam on the boundary between the silicon substrate 2100 and the upper insulating layer 2200 may be increased.

Furthermore, in the THz signal measuring apparatus 1000, because the femtosecond laser beam FS-L is incident from the lower portion of the sample wafer 2000a, even when the sample wafer 2000a includes the additional material layer 2300 on the upper insulating layer 2200, the femtosecond laser beam FS-L may be easily incident on the boundary between the silicon substrate 2100 and the upper insulating layer 2200, thereby generating the first THz signal THz1. In addition, because the first THz signal THz1 is detected through the lower portion of the sample wafer 2000a, the first THz signal THz1 may be accurately detected regardless of the additional material layer 2300.

Figure 4A:
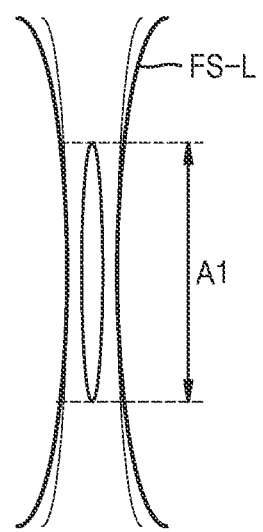
FIGS. 4A and 4B are diagrams illustrating spatial resolutions of THz signal measuring apparatuses.
Figure 4B:
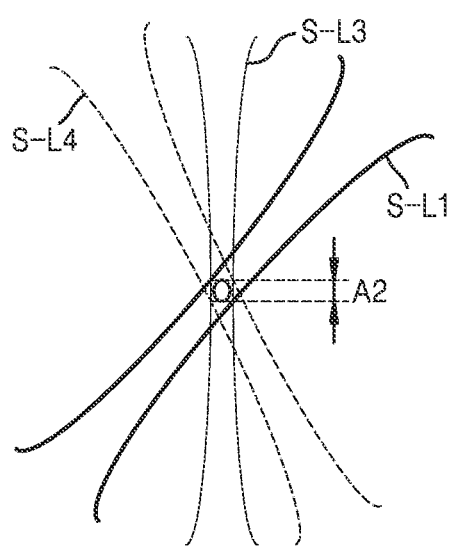

FIGS. 4A and 4B are diagrams illustrating spatial resolutions of THz signal measuring apparatuses. FIG. 4A illustrates a case according to a comparative example, and FIG. 4B illustrates a case according to example embodiments Referring to FIG. 4A, in the case of the THz signal measuring apparatus of the comparative example, because one laser beam is used, a generation area A1 of the THz signal THz0 may be relatively wide, and thus, the spatial resolution of the THz signal measuring apparatus may be low. For example, the THz signal measuring apparatus of the comparative example may have an axial resolution of about 1 μm. For reference, in FIG. 4A, a thick solid line may indicate a first-order component of one laser beam, and a thin solid line may indicate a high-order component of the same laser beam.

Referring to FIG. 4B, in the case of the THz signal measuring apparatus 1000 (i.e., according to an example embodiment), because three laser beams, for example, the first, third, and fourth sub-laser beams S-L1, S-L3, and S-L4, are used, a generation area A2 of the first THz signal THz1 may be very narrow, and thus, the spatial resolution of the THz signal measuring apparatus 1000 may be significantly improved. For example, the THz signal measurement apparatus 1000 may have an axial resolution of about 50 nm to about 100 nm. Only a first-order component of each of the first, third, and the fourth sub-laser beams S-L1, S-L3, and S-L4 may be used to generate the first THz signal THz1.

Figure 5:
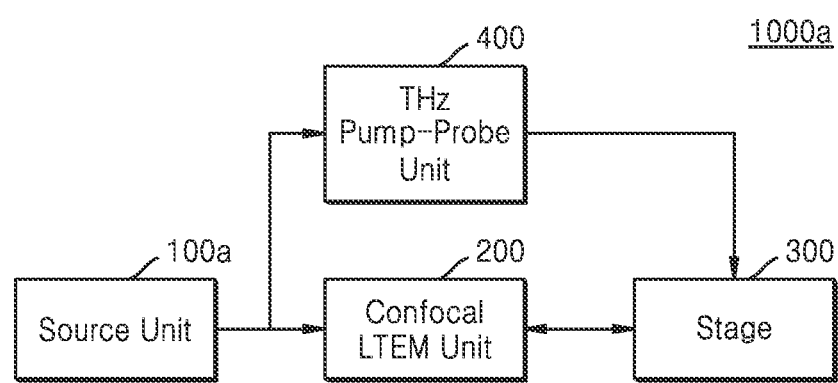
FIG. 5 is a block diagram of a THz signal measuring apparatus according to an embodiment.
Figure 6B:
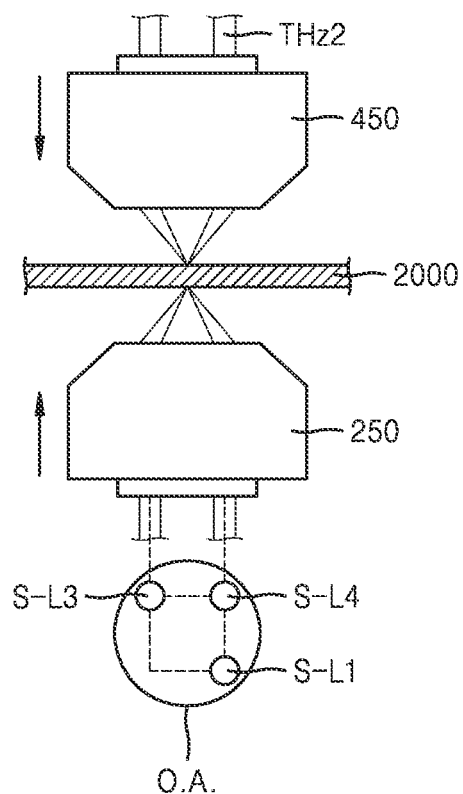
FIG. 6B is an enlarged view illustrating the THz signal measuring apparatus of FIG. 5 according to an embodiment.

FIG. 5 is a block diagram of a THz signal measuring apparatus according to an embodiment. FIG. 6A is a diagram illustrating the THz signal measuring apparatus of FIG. 5 according to an embodiment. FIG. 6B is an enlarged view illustrating the THz signal measuring apparatus of FIG. 5 according to an embodiment. Descriptions of similar aspects made with reference to FIGS. 1 to 4B may be simplified or omitted.

Referring to FIGS. 5 to 6B, a THz signal measuring apparatus 1000a (also referred to as a "measuring apparatus") may be different from the measuring apparatus 1000 of FIG. 1 in that a THz pump-probe unit 400 is further included. Specifically, the measuring apparatus 1000a may include a light source unit 100a, the confocal LTEM unit 200, the stage 300, and the THz pump-probe unit 400. The confocal LTEM unit 200 and the stage 300 may be the same as described in the description of the measuring apparatus 1000 of FIG. 1.

The light source unit 100a may include the light source 110 and a beam splitter 120. The light source 110 may be the same as described in the description of the measuring apparatus 1000 of FIG. 1. The beam splitter 120 may split the femtosecond laser beam FS-L from the light source 110 into a first femtosecond laser beam FS-L1 and a second femtosecond laser beam FS-L2. The first femtosecond laser beam FS-L1 may be input to the confocal LTEM unit 200, and the second femtosecond laser beam FS-L2 may be input to the THz pump-probe unit 400. The first femtosecond laser beam FS-L1 may correspond to the femtosecond laser beam FS-L in the measuring apparatus 1000 of FIG. 1.

The THz pump-probe unit 400 may include a beam shutter 410, a second time difference generator 420, a THz antenna 430, a second dichroic mirror 440, and a second reflective objective lens 450. The beam shutter 410 may physically block the second femtosecond laser beam FS-L2 from the beam splitter 120. In other words, when the beam shutter 410 blocks the second femtosecond laser beam FS-L2, the THz pump-probe unit 400 may not operate, and when the beam shutter 410 passes the second femtosecond laser beam FS-L2, the THz pump-probe unit 400 may operate.

Although the second time difference generator 420 has a different shape from the first time difference generator 230, the second time difference generator 420 may have substantially the same role as the first time difference generator 230. For example, the second time difference generator 420 may delay and adjust the time at which the second femtosecond laser beam FS-L2 is input to the THz antenna 430. The second time difference generator 420 may include first to third optical mirrors 422, 424, and 426. As indicated by a double-sided arrow, the second time difference generator 420 may adjust a delay time of the second femtosecond laser beam FS-L2 by linearly moving the second optical mirror 424.

The THz antenna 430 may generate a second THz signal THz2. In other words, the THz antenna 430 may generate the second THz signal THz2 using the second femtosecond laser beam FS-L2. The second THz signal THz2 from the THz antenna 430 may be input to the sample wafer 2000 through an off-axis parabolic mirror 435, the second dichroic mirror 440, and the second reflective objective lens 450. The second dichroic mirror 440 and the second reflective objective lens 450 may be respectively the same as the first dichroic mirror 260 and the first reflective objective lens 250 of the measuring apparatus 1000 of FIG. 1.

The absorption of the second THz signal THz2 input to the sample wafer 2000 may be changed due to multi-photo excitation of the first, third, and fourth sub-laser beams S-L1, S-L3, and S-L4 at a measurement position. Specifically, as shown in FIG. 6B, the second THz signal THz2 may be input to the upper portion of the sample wafer 2000 through the second reflective objective lens 450, and the first, third, and fourth sub-laser beams S-L1, S-L3, and S-L4 may be input to the lower portion of the sample wafer 2000. In addition, the absorption of the second THz signal THz2 may be changed while passing through a measurement area (i.e., an overlapping area where the first, third, and fourth sub-laser beams S-L1, S-L3, and S-L4 are input) in an overlapping manner. In other words, a difference in absorption of the second THz signal THz2 may occur between when the second THz signal THz2 is multi-photon excited and when the second THz signal THz2 is not excited.

A second THz signal THz2' of which absorption has been changed may be detected through the THz signal measurer 270. In addition, the second THz signal THz2' of which absorption has been changed may be detected through the THz antenna 430. In other words, a portion of the second THz signal THz2' that is transmitted through the lower portion of the sample wafer 2000 may be detected through the THz signal measurer 270. In addition, a portion of the second THz signal THz2' that is reflected to the upper portion of the sample wafer 2000 may be detected through the THz antenna 430. The change in absorption of the second THz signal THz2 will be described in more detail with reference to FIGS. 7A and 7B.

The measuring apparatus 1000a may input, through the confocal LTEM unit 200, the first, third, and fourth sub-laser beams S-L1, S-L3, and S-L4 to a measurement position of the sample wafer 2000 (e.g., into the silicon substrate 2100) in an overlapping manner, and may input the second THz signal THz2 to the measurement position of the sample wafer 2000 through the THz pump-probe unit 400. Accordingly, the THz signal measurer 270 or the THz antenna 430 may detect the second THz signal THz2' of which absorption has been changed. In other words, the THz signal measurer 270 or the THz antenna 430 may obtain pump-probe THz absorption (PPTA) based on a difference in absorption of the second THz signal THz2' that has been detected, and may calculate a doping concentration at the measurement position based on the PPTA. The measuring apparatus 1000a may change the depth of the measurement position of the silicon substrate 2100 of the sample wafer 2000. Accordingly, the measuring apparatus 1000a may measure a doping concentration according to the depth of the silicon substrate 2100 of the sample wafer 2000.

Figure 7A:
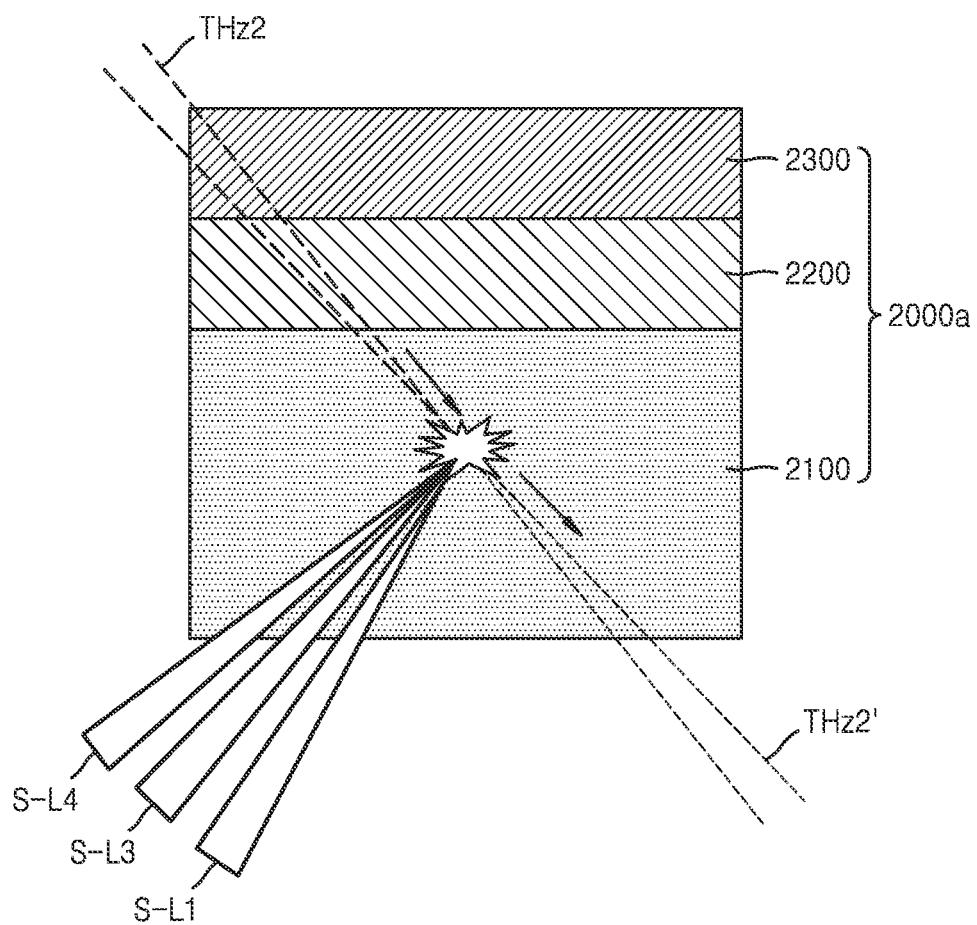
FIG. 7A is a diagram illustrating measuring a doping concentration according to depth in the THz signal measuring apparatus of FIG. 5 according to an embodiment.
Figure 7B:
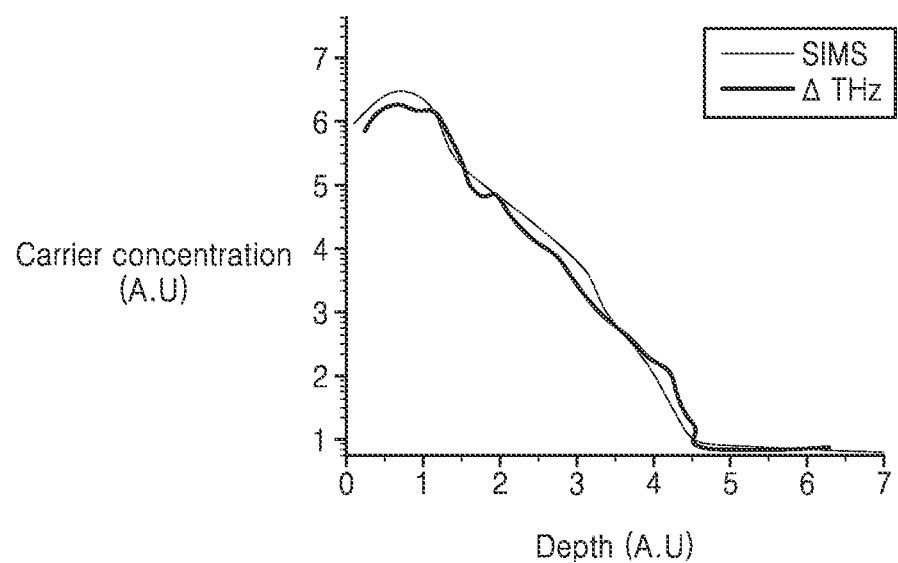
FIG. 7B is a graph illustrating a doping concentration profile according to depth, obtained using the THz signal measuring apparatus of FIG. 5 according to an embodiment.

FIG. 7A is a diagram illustrating measuring a doping concentration according to depth in the THz signal measuring apparatus of FIG. 5 according to an embodiment. FIG. 7B is a graph illustrating a doping concentration profile according to depth, obtained using the THz signal measuring apparatus of FIG. 5 according to an embodiment. In the graph of FIG. 7B, an x-axis and a y-axis respectively denote depth and carrier concentration, both in arbitrary units (A.U.). In addition, the term "SIMS" may refer to secondary ion mass spectrometry, and the term "ΔTHz" may refer to the THz signal measuring apparatus 1000a of FIG. 5.

Referring to FIG. 7A, in the case of the measuring apparatus 1000a, the first, third, and fourth sub-laser beams S-L1, S-L3, and S-L4 may be incident on the lower portion of the sample wafer 2000a through the confocal LTEM unit 200. In addition, the first, third, and fourth sub-laser beams S-L1, S-L3, and S-L4 may be incident on a measurement position of an arbitrary depth in the silicon substrate 2100. The first, third, and fourth sub-laser beams S-L1, S-L3, and S-L4 may generate multi-photon excitation at the measurement position (i.e., an overlapping area). However, because the measurement position is not a boundary between the silicon substrate 2100 and the upper insulating layer 2200, the first THz signal THz1 may not be generated. The second THz signal THz2 may be additionally incident on the upper portion of the sample wafer 2000a through the THz pump-probe unit 400. The absorption of the second THz signal THz2 may be changed based on the multi-photon excitation at the measurement position (i.e., the overlapping area).

As shown in FIG. 7A, the second THz signal THz2' of which absorption has been changed may travel to the lower portion of the sample wafer 2000a, and thus, the second THz signal THz2' may be detected by the THz signal measurer 270. In some embodiments, a portion of the second THz signal THz2' may travel to the upper portion of the sample wafer 2000a due to reflection. The second THz signal THz2' traveling upward may be received and detected by the THz antenna 430. In addition, PPTA may be obtained based on a difference in absorption of the second THz signal THz2' that has been detected, and a doping concentration at the measurement position may be calculated based on the PPTA.

In the measuring apparatus 1000a, the depth of a measurement position (i.e., an overlapping area in the silicon substrate 2100) may be changed. Accordingly, the measuring apparatus 1000a may measure a doping concentration according to the depth of the silicon substrate 2100. In addition, in the measuring apparatus 1000a, the first, third, and fourth sub-laser beams S-L1, S-L3, and S-L4 may have a long wavelength (e.g., a wavelength of 1,000 nm or more). Accordingly, the incident efficiency of a sub-laser beam on the measurement position of the silicon substrate 2100 may be increased.

Furthermore, in the measuring apparatus 1000a, because the first, third, and fourth sub-laser beams S-L1, S-L3, and S-L4 are incident from the lower portion of the sample wafer 2000a, even when the sample wafer 2000a includes the additional material layer 2300 on the upper insulating layer 2200, the first, third, and fourth sub-laser beams S-L1, S-L3, and S-L4 may be easily incident on a measurement position of a required depth in the silicon substrate 2100, regardless of the additional material layer 2300, thereby generating multi-photon excitation. In addition, because the second THz signal THz2' is detected through the lower portion of the sample wafer 2000a, the second THz signal THz2' may be accurately detected regardless of the additional material layer 2300.

Referring to FIG. 7B, it is shown in the graph that the doping concentration profiles of SIMS and ΔTHz have similar shapes. Accordingly, it is shown that measurement of a doping concentration according to depth by the measuring apparatus 1000a has a very high accuracy. For reference, an SIMS may be an apparatus by which high-speed primary ions collide with a surface of a sample, some of atoms or molecules on the surface of the sample that have been released as secondary ions are sent to a mass filter using an acceleration voltage, separated, and then detected. Because the SIMS is a destructive analysis technique, the SIMS may not suitable as a measurement technique for mass production processes, and also may have a disadvantage in that a processing period until analysis is long. There are techniques for measuring, using thermal waves (TWs), a change in reflectivity due to a silicon lattice that is destroyed during ion implantation. However, in the case of a technique using TWs, it is difficult to identify information on a doping concentration profile with respect to depth, and a measured doping concentration tends to be inaccurate. In contrast, the measuring apparatus 1000a according to example embodiments may be a non-destructive and non-contact measuring apparatus, and may accurately obtain information on a doping concentration profile with respect to depth. For reference, the use of the term "ΔTHz" to denote the measuring apparatus 1000a in the graph of FIG. 7B may indicate that the measuring apparatus 1000a uses a difference in absorption of the second THz signal THz2.

Figure 8A:
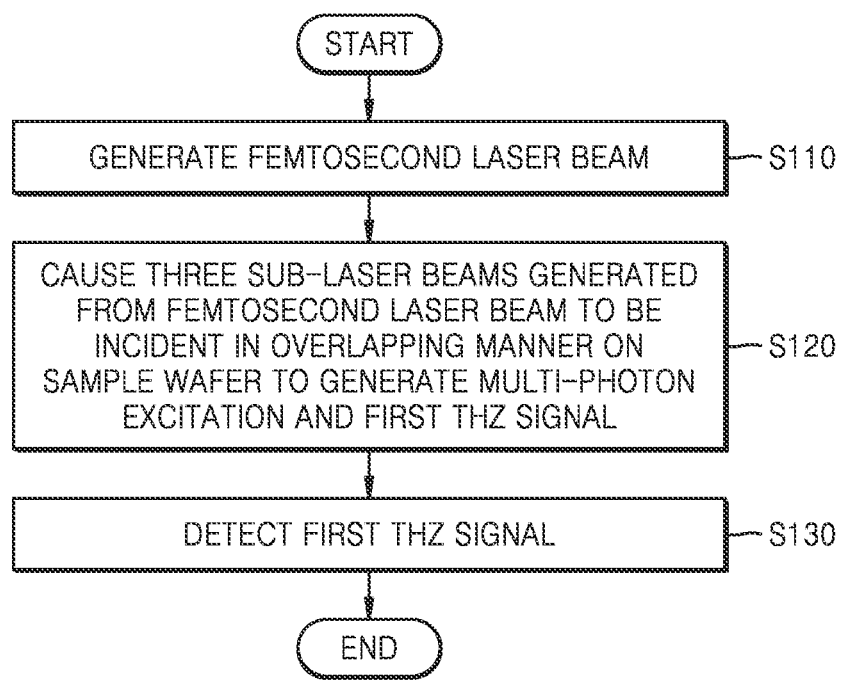
FIGS. 8A and 8B are flowcharts illustrating a THz signal measuring method according to an embodiment.

FIG. 8A is a flowchart illustrating a THz signal measuring method according to an embodiment. Descriptions will be made with reference to the measuring apparatuses 1000 and 1000a, and descriptions already made with reference to of FIGS. 1 to 7B may be simplified or omitted.

Referring to FIG. 8A, in the THz signal measuring method (hereinafter, simply referred to as a "measuring method"), the sample wafer 2000 may be measured using the measuring apparatus 1000 of FIG. 2A. Specifically, in the measuring method, first, the light source 110 of the light source unit 100 may generate the femtosecond laser beam FS-L in operation S110. The femtosecond laser beam FS-L may have, for example, a pulse length of about 10 fs to about 200 fs. In addition, the femtosecond laser beam FS-L may have an NIR wavelength. In the measuring method, the femtosecond laser beam FS-L may have a wavelength of 1,000 nm or more. Specifically, the femtosecond laser beam FS-L may have a wavelength in a range of about 1,000 nm to about 1,600 nm.

the measuring apparatus may cause three sub-laser beams generated from the femtosecond laser beam FS-L to be incident in an overlapping manner on the sample wafer 2000 to generate multi-photon excitation and the first THz signal THz1 in operation S120. More specifically, the femtosecond laser beam FS-L from the light source 110 may be split into four sub-laser beams (e.g., the first to fourth sub-laser beams S-L1, S-L2, S-L3, and S-L4) through the four-way DOE 210. The first to fourth sub-laser beams S-L1, S-L2, S-L3, and S-L4 may be rotated and collimated in a 90° direction by the off-axis parabolic mirror 220. Among the first to fourth sub-laser beams S-L1, S-L2, S-L3, and S-L4 collimated by the off-axis parabolic mirror 220, three sub-laser beams (e.g., the first, third, and fourth sub-laser beams S-L1, S-L3, and S-L4) may be incident on the first reflective objective lens 250 through the first flat mirror 245. In addition, one of the first, third, and fourth sub-laser beams S-L1, S-L3, and S-L4 may pass through the optical chopper 240 and be incident on the first reflective objective lens 250 through the first flat mirror 245. Because the first, third, and fourth sub-laser beams S-L1, S-L3, and S-L4 are incident in an overlapping manner on a measurement position of a boundary between the silicon substrate 2100 and the upper insulating layer 2200, multi-photon excitation may be generated, and thus, the first THz signal THz1 may be generated. The remaining one sub-laser beam (e.g., the second sub-laser beam S-L2) may be a reference beam, and may be incident on the THz signal measurer 270 through the first time difference generator 230.

Subsequently, the first THz signal THz1 may be detected in operation S130. More specifically, the first THz signal THz1 generated in a measurement portion of the sample wafer 2000 may be input to the THz signal measurer 270 through the first reflective objective lens 250, the first dichroic mirror 260, and the off-axis parabolic mirror 265. The first THz signal THz1 may induce birefringence of the EO crystal 272 of the THz signal measurer 270, and thus, the polarization state of the second sub-laser beam S-L2 as a reference beam may be changed as the second sub-laser beam S-L2 passes through the EO crystal 272, the λ/4 plate 274, and the polarizer 276 of the THz signal measurer 270. In addition, the photodetectors 278 of the THz signal measurer 270 may respectively detect powers of two polarization components of the second sub-laser beam S-L2 split by the polarizer 276, and may respectively output electrical signals according to the detected powers. Consequently, by detecting the polarization state of the second sub-laser beam S-L2 as a reference beam using the EO crystal 272, the λ/4 plate 274, the polarizer 276, and the photodetectors 278, the THz signal measurer 270 may indirectly detect the intensity of the first THz signal THz1 generated by the sample wafer 2000. In addition, based on the indirectly detected intensity of the first THz signal THz1, information about the presence or absence of defects or a doping concentration of ions in the measurement portion of the sample wafer 2000 may be obtained.

Figure 8B:
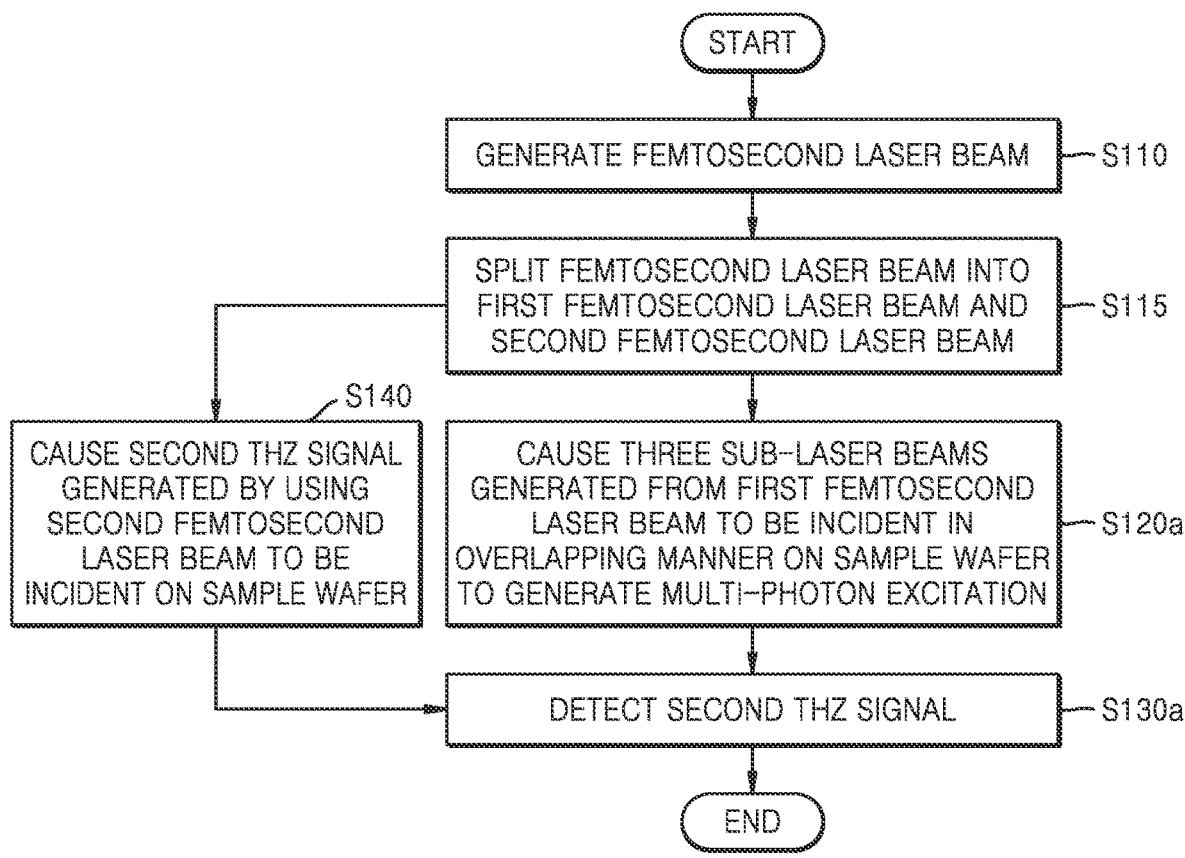

FIG. 8B is a flowchart illustrating a THz signal measuring method according to an embodiment. Referring to FIG. 8B, the sample wafer 2000 may be measured using the measuring apparatus 1000a of FIG. 6A. Specifically, in the measuring method of FIG. 8B, the light source 110 of the light source unit 100 may generate the femtosecond laser beam FS-L in operation S110. The femtosecond laser beam FS-L may have, for example, a pulse length of about 10 fs to about 200 fs. In addition, the femtosecond laser beam FS-L may have, for example, a wavelength in a range of about 1,000 nm to about 1,600 nm.

The femtosecond laser beam FS-L from the light source 110 may be split into the first femtosecond laser beam FS-L1 and the second femtosecond laser beam FS-L2 through the beam splitter 120 in operation S115. The first femtosecond laser beam FS-L1 may be input to the confocal LTEM unit 200, and the second femtosecond laser beam FS-L2 may be input to the THz pump-probe unit 400.

The measuring apparatus may cause three sub-laser beams generated from the first femtosecond laser beam FS-L1 to be incident in an overlapping manner on the sample wafer 2000 to generate multi-photon excitation in operation S120a. More specifically, the first femtosecond laser beam FS-L1 from the beam splitter 120 may be split into four sub-laser beams (e.g., the first to fourth sub-laser beams S-L1, S-L2, S-L3, and S-L4) through the four-way DOE 210. The first to fourth sub-laser beams S-L1, S-L2, S-L3, and S-L4 may be rotated and collimated in a 90° direction by the off-axis parabolic mirror 220. Among the first to fourth sub-laser beams S-L1, S-L2, S-L3, and S-L4 collimated by the off-axis parabolic mirror 220, three sub-laser beams (e.g., the first, third, and fourth sub-laser beams S-L1, S-L3, and S-L4) may be incident on the first reflective objective lens 250 through the first flat mirror 245. In addition, one sub-laser beam among the first, third, and fourth sub-laser beams S-L1, S-L3, and S-L4 may pass through the optical chopper 240 and be incident on the first reflective objective lens 250 through the first flat mirror 245. The first, third, and fourth sub-laser beams S-L1, S-L3, and S-L4 may be incident in an overlapping manner on a measurement position inside the silicon substrate 2100 of the sample wafer 2000, thereby generating multi-photon excitation. The remaining one sub-laser beam (e.g., the second sub-laser beam S-L2) may be a reference beam, and may be incident on the THz signal measurer 270 through the first time difference generator 230.

The measuring apparatus may cause the second THz signal THz2 generated using the second femtosecond laser beam FS-L2 to be incident on the measurement position of the sample wafer 2000 in operation S140. Operation S140 may be performed simultaneously or substantially simultaneously with operation S120a. More specifically, the second femtosecond laser beam FS-L2 from the beam splitter 120 may be caused to be incident on the THz antenna 430 through the beam shutter 410 and the second time difference generator 420 of the THz pump-probe unit 400. The THz antenna 430 may generate the second THz signal THz2 using the second femtosecond laser beam FS-L2. The second THz signal THz2 from the THz antenna 430 may be input to the measurement position of the sample wafer 2000 through the off-axis parabolic mirror 435, the second dichroic mirror 440, and the second reflective objective lens 450.

The absorption of the second THz signal THz2 input to the sample wafer 2000 may be changed due to the multi-photo excitation of the first, third, and fourth sub-laser beams S-L1, S-L3, and S-L4 at the measurement position (i.e., an overlapping area). For example, the second THz signal THz2 may be input to the upper portion of the sample wafer 2000 through the second reflective objective lens 450, and the first, third, and fourth sub-laser beams S-L1, S-L3, and S-L4 may be input to the lower portion of the sample wafer 2000. In addition, the absorption of the second THz signal THz2 may be changed while passing through the overlapping area. In other words, a difference in absorption of the second THz signal THz2 may occur between when the second THz signal THz2 is multi-photon excited and when the second THz signal THz2 is not excited.

Subsequently, the second THz signal THz2' may be detected in operation S130a. The process of detecting the second THz signal THz2' may be substantially the same as the detection principle of the first THz signal THz1 in the measuring method of FIG. 8A. However, in the measuring method of FIG. 8A, the first THz signal THz1 generated at the boundary between the silicon substrate 2100 and the upper insulating layer 2200 may be detected by the THz signal measurer 270 using the reference beam. In contrast, in the measuring method of FIG. 8B, the second THz signal THz2' (i.e., the second THz signal THz2 which is additionally incident on the sample wafer 2000 and of which absorption is changed while passing through the overlapping area of an arbitrary depth in the silicon substrate 2100) may be detected by the THz signal measurer 270 using the reference beam. In addition, in example embodiments, the second THz signal THz2' may be detected through the THz antenna 430.

In the measuring method, the first, third, and fourth sub-laser beams S-L1, S-L3, and S-L4 may be input, through the confocal LTEM unit 200, to a measurement position of the sample wafer 2000 (e.g., into the silicon substrate 2100) in an overlapping manner, and the second THz signal THz2 may be input to the measurement position of the sample wafer 2000 through the THz pump-probe unit 400. Accordingly, the THz signal measurer 270 may detect the second THz signal THz2' of which absorption has been changed. In addition, in the measuring method of FIG. 8B, the second THz signal THz2' may be detected while changing the depth of the measurement position of the silicon substrate 2100 of the sample wafer 2000. Accordingly, in the measuring method, a doping concentration according to the depth of the silicon substrate 2100 of the sample wafer 2000 may be measured.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A measuring apparatus comprising:
    a stage comprising a transmissive wafer chuck on which a sample wafer is provided, wherein the sample wafer comprises:
        a silicon substrate; and
        at least one material layer on the silicon substrate;
    a light source unit comprising a light source configured to generate and output a femtosecond laser beam; and
    a confocal laser-induced terahertz (THz) emission microscopy (LTEM) unit configured to generate multi-photon excitation by:
        splitting the femtosecond laser beam into four sub-laser beams; and
        causing three sub-laser beams among the four sub-laser beams to be incident in an overlapping manner on a measurement position of the sample wafer, wherein the confocal LTEM unit is configured to generate the multi-photon excitation based on the three sub-laser beams being incident on a lower surface of the silicon substrate.

2. The measuring apparatus of claim 1, wherein the confocal LTEM unit comprises a four-way diffractive optic element (DOE), a first time difference generator, an optical chopper, a first reflective objective lens, a first dichroic mirror, and a THz signal measurer.

3. The measuring apparatus of claim 2, wherein the confocal LTEM unit is configured to split the femtosecond laser beam into the four sub-laser beams using the four-way DOE,
    wherein the confocal LTEM unit is configured such that a remaining one sub-laser beam among the four sub-laser beams is input to the THz signal measurer as a reference beam through the first time difference generator,
    wherein the measurement position is a boundary between the silicon substrate and the at least one material layer, and
    wherein a first THz signal is generated through the multi-photon excitation.

4. The measuring apparatus of claim 3, wherein the confocal LTEM unit is configured such that one sub-laser beam among the three sub-laser beams is modulated by the optical chopper,
    wherein the THz signal measurer comprises a lock-in-amp, and
    wherein the lock-in-amp is configured to exclude a signal generated by one or two sub-laser beams among the four sub-laser beams when the first THz signal is measured.

5. The measuring apparatus of claim 1, wherein the light source unit further comprises a beam splitter configured to split the femtosecond laser beam into a first femtosecond laser beam and a second femtosecond laser beam,
    wherein the confocal LTEM unit is configured to split the first femtosecond laser beam into the four sub-laser beams, and
    wherein the measuring apparatus further comprises a THz pump-probe unit configured to:
        generate a second THz signal using the second femtosecond laser beam; and
        cause the second THz signal to be incident on the measurement position.

6. The measuring apparatus of claim 5, wherein the THz pump-probe unit comprises a beam shutter, a second time difference generator, a THz antenna, a second dichroic mirror, and a second reflective objective lens.

7. The measuring apparatus of claim 6, wherein the measurement position is inside the silicon substrate, and
    wherein the confocal LTEM unit is configured such that the multi-photon excitation causes absorption of the second THz signal to be changed based on to a depth of the measurement position.

8. The measuring apparatus of claim 5, wherein the second THz signal is incident on an upper surface of the silicon substrate through the at least one material layer, and
    wherein the confocal LTEM unit further comprises a THz signal measurer configured to receive the second THz signal having a changed absorption.

9. The measuring apparatus of claim 1, wherein the measuring apparatus has a spatial resolution of about 50 nm to about 100 nm with respect to the measurement position.

10. The measuring apparatus of claim 1, wherein the femtosecond laser beam has a wavelength of about 1,000 nm to about 1,600 nm.

11. The measuring apparatus of claim 1, wherein the sample wafer comprises:
 an insulating layer on the silicon substrate; and
 an opaque layer or a metal layer on the insulating layer,
 wherein the measurement position comprises a boundary between the silicon substrate and the insulating layer, and
 wherein the measuring apparatus is configured to measure a doping concentration or defect at the boundary based on a first THz signal generated by the multi-photon excitation.

12. A measuring apparatus comprising:
 a stage comprising a transmissive wafer chuck on which a sample wafer is arranged, wherein the sample wafer comprises:
  a silicon substrate; and
  an insulating layer on the silicon substrate;
 a light source unit comprising:
  a light source configured to generate and output a femtosecond laser beam; and
  a beam splitter configured to split the femtosecond laser beam into a first femtosecond laser beam and a second femtosecond laser beam;
 a confocal laser-induced terahertz (THz) emission microscopy (LTEM) unit comprising a four-way diffractive optic element (DOE), a first time difference generator, an optical chopper, a first reflective objective lens, a first dichroic mirror, and a THz signal measurer, the confocal LTEM unit being configured to generate multi-photon excitation by causing three sub-laser beams among four sub-laser beams split from the first femtosecond laser beam to be incident in an overlapping manner on a measurement position of the sample wafer; and
 a THz pump-probe unit comprising a beam shutter, a second time difference generator, a THz antenna, a second dichroic mirror, and a second reflective objective lens, the THz pump-probe unit being configured to:
  generate a first THz signal using the second femtosecond laser beam; and
  cause the first THz signal to be incident on the measurement position; and
 wherein the confocal LTEM unit is configured to generate multi-photon excitation based on the three sub-laser beams being incident on a lower surface of the silicon substrate, and
 wherein the first THz signal passes through the SiO$_2$ insulating layer to be incident on an upper surface of the silicon substrate.

13. The measuring apparatus of claim 12, wherein the four-way DOE is configured to split the first femtosecond laser beam into the four sub-laser beams,
 wherein the first time difference generator is configured to input a remaining one sub-laser beam among the four sub-laser beams to the THz signal measurer as a reference beam, and
 wherein the measurement position is a boundary between the silicon substrate and the SiO$_2$ insulating layer, or is inside the silicon substrate.

14. The measuring apparatus of claim 13, wherein the measurement position is the boundary between the silicon substrate and the SiO$_2$ insulating layer,
 wherein the beam shutter is configured to block the second femtosecond laser beam such that the THz pump-probe unit does not operate,
 wherein the confocal LTEM unit is configured such that a second THz signal is generated through the multi-photon excitation,
 wherein the optical chopper is configured to modulate one sub-laser beam among the three sub-laser beams,
 wherein the THz signal measurer comprises a lock-in-amp, and
 wherein the lock-in-amp is configured to exclude a signal generated by one or two sub-laser beams among the four sub-laser beams when the second THz signal is measured.

15. The measuring apparatus of claim 13, wherein the measurement position is inside the silicon substrate,
 wherein the confocal LTEM unit is configured such that the multi-photon excitation causes absorption of the first THz signal to be changed based on a depth of the measurement position, and
 wherein a doping concentration corresponding to the depth of the measurement position is measured based on the change in the absorption of the first THz signal.

16. The measuring apparatus of claim 12, wherein the femtosecond laser beam has a wavelength of about 1,000 nm to about 1,600 nm, and
 wherein the measuring apparatus has a spatial resolution of about 50 nm to about 100 nm with respect to the measurement position.

17. A measuring apparatus comprising:
 a stage comprising a transmissive wafer chuck on which a sample wafer is arranged, wherein the sample wafer comprises:
  a silicon substrate; and
  at least one material layer on the silicon substrate;
 a light source unit comprising:
  a light source configured to generate and output a femtosecond laser beam, and
  a beam splitter configured to split the femtosecond laser beam into a first femtosecond laser beam and a second femtosecond laser beam;
 a confocal laser-induced terahertz (THz) emission microscopy (LTEM) unit configured to generate multi-photon excitation by:
  splitting the first femtosecond laser beam into four sub-laser beams; and
  causing three sub-laser beams among the four sub-laser beams to be incident in an overlapping manner on a measurement position of the sample wafer; and
 a THz pump-probe unit configured to:
  generate a first THz signal using the second femtosecond laser beam; and
  cause the first THz signal to be incident on the measurement position;
 wherein the confocal LTEM unit is configured to generate the multi-photon excitation based on the three sub-laser beams being incident on a lower surface of the silicon substrate, and
 wherein the first THz signal passes through the at least one material layer to be incident on an upper surface of the silicon substrate.

18. The measuring apparatus of claim 17, wherein the confocal LTEM unit comprises a four-way diffractive optic element (DOE), a first time difference generator, an optical chopper, a first reflective objective lens, a first dichroic mirror, and a THz signal measurer, and wherein the THz pump-probe unit comprises a beam shutter, a second time difference generator, a THz antenna, a second dichroic mirror, and a second reflective objective lens.

19. The measuring apparatus of claim 18, wherein the four-way DOE is configured to split the first femtosecond laser beam into the four sub-laser beams, wherein the first time difference generator is configured to input a remaining one sub-laser beam among the four sub-laser beams to the THz signal measurer as a reference beam, and wherein the measurement position is a boundary between the silicon substrate and the at least one material layer, or is inside the silicon substrate.

20. The measuring apparatus of claim 17, wherein, the confocal LTEM unit is configured such that, based on the measurement position being a boundary between the silicon substrate and the at least one material layer, a second THz signal is generated by the multi-photon excitation and is measured without operation of the THz pump-probe unit, and wherein the confocal LTEM unit is configured such that, based on the measurement position being inside the silicon substrate, a change in absorption of the first THz signal due to the multi-photon excitation is measured based on a depth of the measurement position.

* * * * *